United States Patent
Mitsuhashi et al.

(10) Patent No.: US 8,016,356 B2
(45) Date of Patent: Sep. 13, 2011

(54) GEARS AND COUPLING APPARATUS USING THE GEARS

(75) Inventors: Atsutaka Mitsuhashi, Aichi-ken (JP); Makoto Asano, Toyota (JP)

(73) Assignee: Toyota Boshoku Kabushiki Kaisha, Aichi-Ken (JP)

( * ) Notice: Subject to any disclaimer, the term of this patent is extended or adjusted under 35 U.S.C. 154(b) by 338 days.

(21) Appl. No.: 12/375,588

(22) PCT Filed: Jun. 14, 2007

(86) PCT No.: PCT/JP2007/062012
§ 371 (c)(1),
(2), (4) Date: Jan. 29, 2009

(87) PCT Pub. No.: WO2008/015845
PCT Pub. Date: Feb. 7, 2008

(65) Prior Publication Data
US 2009/0301247 A1    Dec. 10, 2009

(30) Foreign Application Priority Data
Jul. 31, 2006  (JP) .................................. 2006-208331

(51) Int. Cl.
*B60N 2/02*    (2006.01)

(52) U.S. Cl. ........................................ 297/366; 297/367
(58) Field of Classification Search .................. 297/366, 297/367
See application file for complete search history.

(56) References Cited

U.S. PATENT DOCUMENTS

| 3,826,152 | A |   | 7/1974 | Alexeev et al. |
| 3,946,621 | A |   | 3/1976 | Rouverol |
| 3,982,445 | A |   | 9/1976 | Rouverol |
| 4,379,976 | A |   | 4/1983 | Pitchford et al. |
| 4,387,862 | A | * | 6/1983 | Sakurada et al. .............. 242/385 |
| 5,913,744 | A |   | 6/1999 | Rennerfelt |
| 6,080,076 | A |   | 6/2000 | Kwoka et al. |
| 6,248,993 | B1 | * | 6/2001 | Bunselmeier et al. ... 250/231.13 |
| 6,420,697 | B1 | * | 7/2002 | Donner et al. ........... 250/231.14 |
| 2002/0170373 | A1 |   | 11/2002 | Kim et al. |
| 2007/0032332 | A1 |   | 2/2007 | Ito |

FOREIGN PATENT DOCUMENTS

| JP | 10-505400 A | 5/1998 |
| JP | 11-190416 A | 7/1999 |
| JP | 2005-083535 A | 3/2005 |
| JP | 2005-230116 A | 9/2005 |
| WO | 96/05451 | 2/1996 |
| WO | 2005/025930 | 3/2005 |

OTHER PUBLICATIONS

English language Abstract of JP 10-505400 A; May 26, 1998.
English language Abstract of JP 2005-083535 A; Mar. 31, 2005.
English language Abstract of JP 11-190416 A; Jul. 13, 1999.
English language Abstract of JP 2005-230116 A; Sep. 2, 2005.
Search report from E.P.O., mail date is Dec. 2, 2010.

* cited by examiner

*Primary Examiner* — David Dunn
*Assistant Examiner* — Erika Garrett
(74) *Attorney, Agent, or Firm* — Greenblum & Bernstein, P.L.C.

(57) ABSTRACT

Tooth shapes of gears are formed such that a meshing line given by meshing of an inner gear and an outer gear provided in a state of meshing with each other for enabling transmission of a power is configured as a spiral mesh line.

2 Claims, 10 Drawing Sheets

GEARS AND COUPLING APPARATUS USING THE GEARS

TECHNICAL FIELD

The present invention relates to gears and a coupling apparatus using the gears. More specifically, the present invention relates to gears constituting a gear train provided in a state of meshing with each other for enabling transmission of a power.

BACKGROUND ART

In a background art, in a vehicular seat, there is known a constitution of arranging a reclining apparatus operable to adjust a backrest angle of a seat back. Here, JP-A-2005-83535 discloses a specific constitution of the above-described reclining apparatus. According to the disclosed reclining apparatus, an outer gear is disposed in a state of meshing with an inner gear, and the backrest angle of the seat back is varied by a relative revolving movement of the outer gear along an inner peripheral tooth face of the inner gear.

Further, according to the disclosure, a tooth shape of the above-described inner gear or outer gear is formed to have a shape of a cycloid curve or a trochoid curve. For this reason, a meshing line of the two gears is set to a shape of a circular arc, and therefore, in comparison with a gear train of a publicly-known tooth shape having an involute curve resulting a linear meshing line, a meshing strength can be increased by the increase in the meshing rate.

DISCLOSURE OF THE INVENTION

Problems to be Solved by the Invention

However, according to the background art described in the above patent document, although the meshing line of the gear train can be set to the shape of the circular arc, the meshing rate can be adjusted only within a limited narrow range.

Thus there is a need in the art for increasing a meshing rate of a gear train.

Means for Solving the Problems

In order to solve the problem, gears and a coupling apparatus using the gears of the invention adopts the following means.

First, the first invention is gears constituting a gear train provided in a state of meshing with each other for enabling transmission of a power. Tooth shapes are formed such that a meshing line given by meshing of the gear train is configured as a spiral mesh line.

Here, 'spiral' includes a spiral drawn by a bent curve line as well as a spiral drawn by bending a linear line little by little.

According to the first invention, because the meshing line of the gear train is drawn as a spiral, a length of the meshing line existing inside of a predetermined region in a circumferential direction is set to be longer.

Next, the second invention is a coupling apparatus using the gears of the above-described first invention. The coupling apparatus is arranged as a reclining apparatus coupling a seat back and a seat cushion of a vehicular seat. The reclining apparatus includes an inner tooth member including an inner gear and an outer tooth member including an outer gear assembled in meshing with the inner gear of the inner tooth member. The inner tooth member is coupled to one of the seat back and the seat cushion, and the outer tooth member is coupled to other of the seat back and the seat cushion. The outer gear is smaller than the inner gear in a diameter thereof and is formed to have a tooth number different from a tooth number of the inner gear. A backrest angle of the seat back is varied by a relative circulating movement of the outer gear on an inner tooth face of the inner gear in a state where the outer gear meshes with the inner gear. The meshing line given by the gear train of the outer gear and the inner gear is configured as a spiral mesh line.

According to the second invention, the reclining apparatus is operated to adjust the backrest angle of the seat back by the relative circulating movement of the outer gear on an inner tooth face of the inner gear. Because the meshing line given by the gear train of the outer gear and the inner gear is configured as a spiral mesh line, a length of the meshing line existing inside of a predetermined region in a circumferential direction is set to be longer.

Next, according to the third invention, in the above-described second invention, a spiral defined by the meshing line of the outer gear and the inner gear is an Archimedean spiral.

According to the third invention, the meshing line given by the meshing of the gear train is drawn by the Archimedean spiral having a constant circumferential interval.

Next, according to the fourth invention, in the second or the third invention, the inner gear is formed to project in a circular cylinder shape from the inner gear member by a half blanking process. Also, the outer gear is formed to project in a circular cylinder shape from the outer gear member by a half blanking process. The inner tooth member is formed with a cylinder portion in a circular cylinder shape projecting from a center portion of the inner gear. The outer tooth member is formed with a through hole in a circular shape at a center portion of the outer gear for receiving therein and surrounding the cylinder portion formed on the inner tooth member. The cylinder portion and the through hole have a positional relationship in which their center portions are offset from each other. Further, within a gap between the cylinder portion of the inner tooth member and the through hole of the outer tooth member surrounding the cylinder portion, a pair of eccentric members each having a shape of filling a portion of a shape of the gap are disposed. The pair of eccentric members normally wedge into narrowed portions of the gap shape in an inserted manner by being urged and are maintained in a state where the outer gear is pressed against the inner peripheral tooth face of the inner gear. As either one of the eccentric members is operated to be pushed in a circumferential direction by a rotational operation of a shaft pin inserted into a cylinder of the cylinder portion, the either one of the eccentric members is released from the wedging state and presses against an inner peripheral face of the through hole of the outer tooth member to cause circulating movement of the outer gear.

According to the fourth invention, because the pair of eccentric members wedge into narrowed portions of the gap shape in an inserted manner by being urged and are maintained in the state where the outer gear is pressed against the inner peripheral tooth face of the inner gear, the two gears are maintained in the state where they are prevented from rotation relative to each other without a backlash. As either one of the eccentric members is operated to be pushed in the circumferential direction by the rotational operation of the shaft pin inserted into the cylinder of the cylinder portion, the either one of the eccentric members is released from the wedging state and presses against the inner peripheral face of the through hole of the outer tooth member to cause circulating movement of the outer gear.

Advantage of the Invention

The invention can achieve the following effect by adopting the above-described means.

First, according to the first invention, by forming the tooth shapes such that the meshing line given by meshing of the gear train is configured as a spiral mesh line, the meshing rate of the gear train can be improved.

Further, according to the second embodiment, by constituting the reclining apparatus of the vehicular seat by using the gear train having the tooth shapes of the first invention, the operation for adjusting the backrest angle of the seat back can excellently be carried out.

Further, according to third invention, by defining the meshing line of the gear train as the Archimedean spiral having the constant circumferential interval, the tooth shapes can highly accurately be finished by a numerical control.

Further, according to the fourth invention, by the construction in which the pair of eccentric members press the outer gear against the inner peripheral tooth face of the inner gear to maintain the state where their positional condition is maintained without a backlash or in which the outer gear is pushed to cause revolution, the operation for maintaining or adjusting the backrest angle of the seat back can further excellently be carried out.

DESCRIPTION OF REFERENCE NUMERALS AND SIGNS

Figure 1:
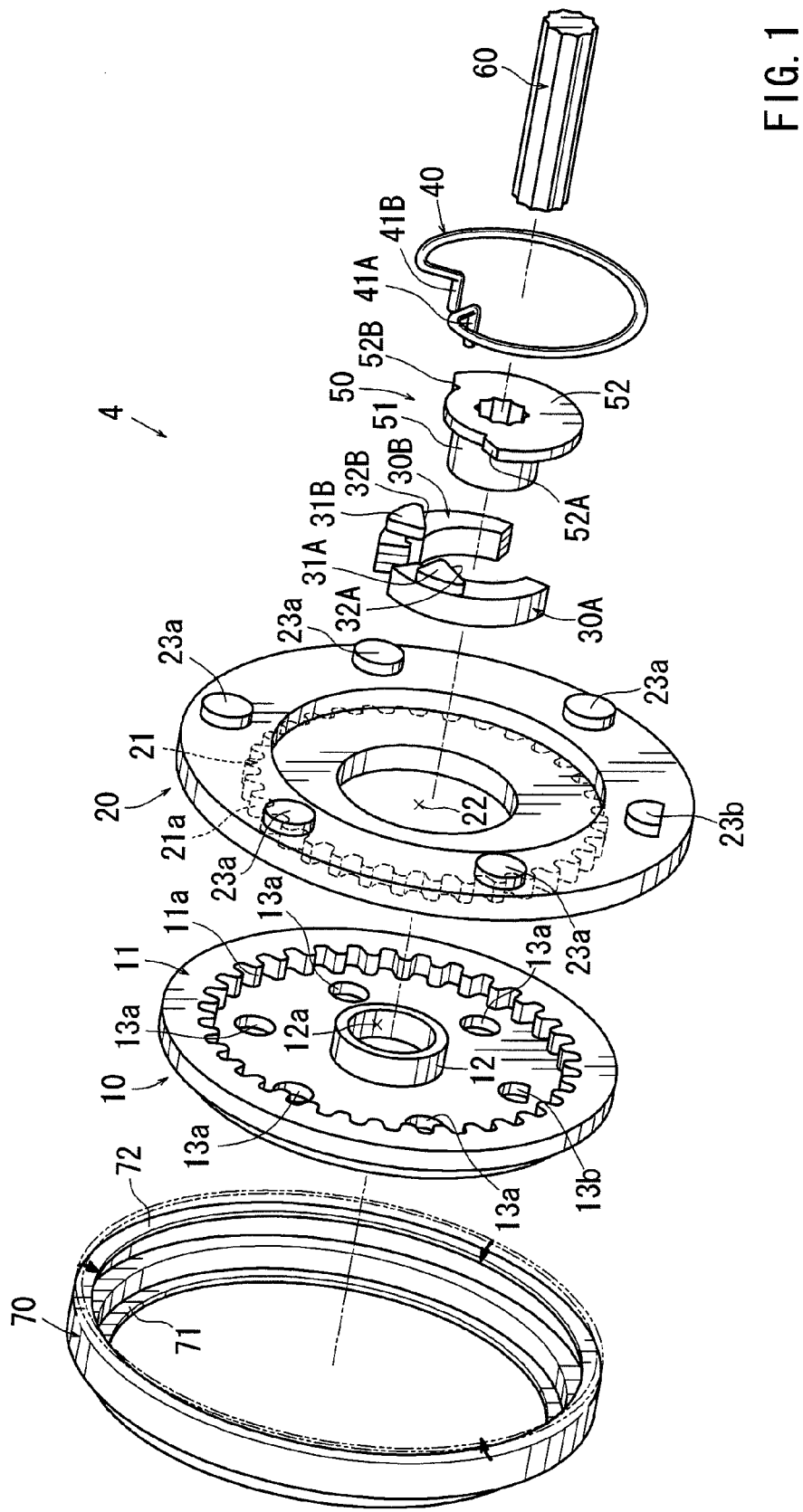
FIG. 1 is an exploded perspective view of a reclining apparatus of Embodiment 1.

1 . . . vehicular seat
2 . . . seat back
2f . . . back frame
2a . . . dowel hole
2b . . . D dowel hole
2c . . . inserting hole
3 . . . seat cushion
3f . . . cushion frame
3a . . . dowel hole
3b . . . D dowel hole
3c . . . inserting hole
4 . . . reclining apparatus
10 . . . inner tooth member
11 . . . inner gear
11a . . . inner tooth
11r . . . center
11p . . . pitch circle
11h . . . effective addendum circle
11m . . . addendum circle
11n . . . deddendum circle
12 . . . cylinder portion
12a . . . inserting hole
13a . . . dowel
13b . . . D dowel
20 . . . outer tooth member
21 . . . outer gear
21a . . . outer tooth
21r . . . center
21p . . . pitch circle
21h . . . effective addendum circle
21m . . . addendum circle
21n . . . deddendum circle
22 . . . through hole
23a . . . dowel
23b . . . D dowel
30A, 30B . . . eccentric members
31A, 31B . . . projected portions
32A, 32B . . . contact faces
40 . . . spring member
41A, 41B . . . latching portions
50 . . . pushing member
51 . . . fitting portion
52 . . . fin
52A, 52B . . . pushing face portion
60 . . . shaft pin
70 . . . outer peripheral ring
71 . . . inner tooth side holding face
72 . . . outer tooth side holding face
Tr . . . contact point locus line
P, O . . . points
B1 through B3 . . . points
A1 through A3 . . . points
P1 through P3 . . . points
Ve1 through Ve3 . . . normal lines
Ge . . . mesh region
R1 through R4 . . . R shape portions
a, b . . . intersections

DETAILED DESCRIPTION OF THE INVENTION

Embodiments of the invention will be explained in reference to the drawings as follows.

Embodiment 1

At first, the construction of gears of Embodiment 1 and a coupling apparatus using the gears will be explained in reference to FIG. 1 through FIG. 10. Here, FIG. 2 schematically shows in a perspective view the construction of a vehicular seat 1 including reclining apparatus 4, 4 that correspond to a coupling apparatus of the invention.

The vehicular seat 1 is constructed to include a seat back 2 constituting a back rest and a seat cushion 3 constituting a seating portion and to connect these elements by a pair of the reclining apparatus 4, 4 provided on both left and right sides thereof. Therefore, the seat back 2 is configured to be operable to adjust a backrest angle relative to the seat cushion 3 in accordance with a cooperative operation of the respective reclining apparatus 4, 4. The reclining apparatus 4, 4 are configured to be operated in synchronism with each other and to be switched to a state of enabling to adjust the backrest angle of the seat back 2 and a state of enabling to maintain the head rest angle as described later.

The detailed constitution of the reclining apparatus 4, 4 will be explained as follows. Here, because the reclining apparatus 4, 4 have the same basic construction, in the following explanation, an explanation will be given to only one reclining apparatus 4 shown on the right side of the drawings as a representative of them.

Figure 2:
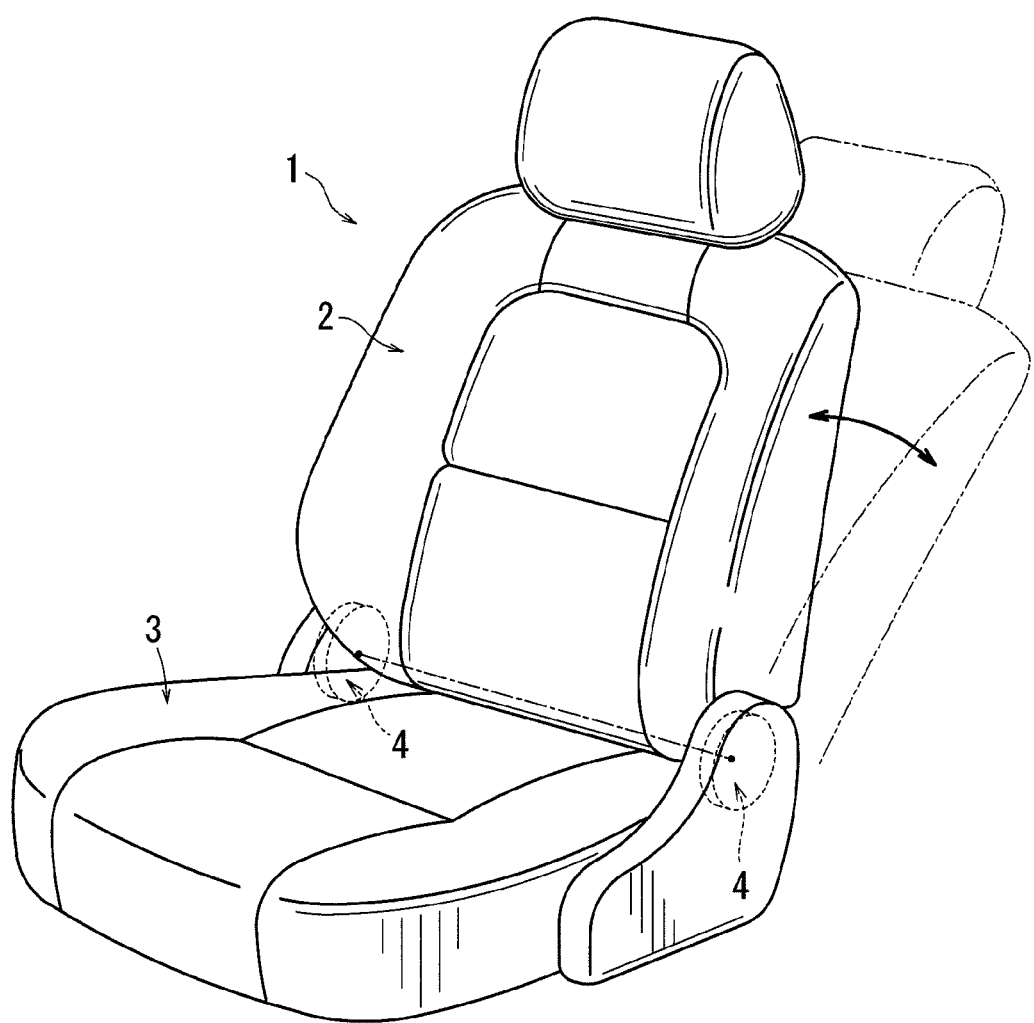
FIG. 2 is a perspective view showing a schematic constitution of a vehicular seat.

Here, FIG. 1 shows an exploded perspective view of the reclining apparatus 4. The reclining apparatus 4 is configured to operate as a shaft pin 60 inserted into a center position thereof is operated to rotate in accordance with driving for rotation of an electric motor, not illustrated. The electric motor is configured to be operated for switching to ON/OFF and normal rotation/reverse rotation by the switching operating of switch a switch, not illustrated, arranged, for example, at a position of a side portion or the like of the vehicular seat 1.

The reclining apparatus 4 is under the state of maintaining the backrest angle of the seat back 2 normally before the shaft pin 60 is operated to rotate. Further, the reclining apparatus 4 is configured to perform the operation for adjusting the backrest angle of the seat back 2 by the rotational movement of the shaft pin 60 as the shaft pin is operated to be driven.

Specifically, the reclining apparatus 4 is constituted by an assembly of an inner tooth member 10, an outer tooth member 20, a pair of eccentric members 30A, 30B, a spring member 40, a pushing member 50, the shaft pin 60, and an outer peripheral ring 70. These members are formed of metal members.

The detailed constructions of these members will be explained in detail successively as follows.

First, the inner tooth member 10 will be explained.

The inner tooth member 10 is formed in a shape of a circular disk and is formed to have an outer peripheral edge of the circular disk shape projecting in a shape of a circular cylinder toward the outer tooth member 20 by a half blanking process in an axial direction. Further, inner teeth 11a are formed on an inner peripheral face of the projected portion having a circular cylinder shape. Therefore, the projected portion having the circular cylinder shape is formed as an inner gear 11.

Further, an inserting hole 12a capable of inserting the shaft pin 60 in the axial direction is formed in a center portion of the inner tooth member 10. The inserting hole 12a is formed to penetrate in a plate thickness direction of the inner tooth member 10 and its center is coaxial with a center 11r of the inner gear 11.

Further, the inner tooth member 10 is formed with a cylinder portion 12 in a shape of projecting in a circular cylinder shape toward the outer tooth member 20 by a half blanking process of a peripheral edge portion of the inserting hole 12a in the axial direction.

Figure 3:
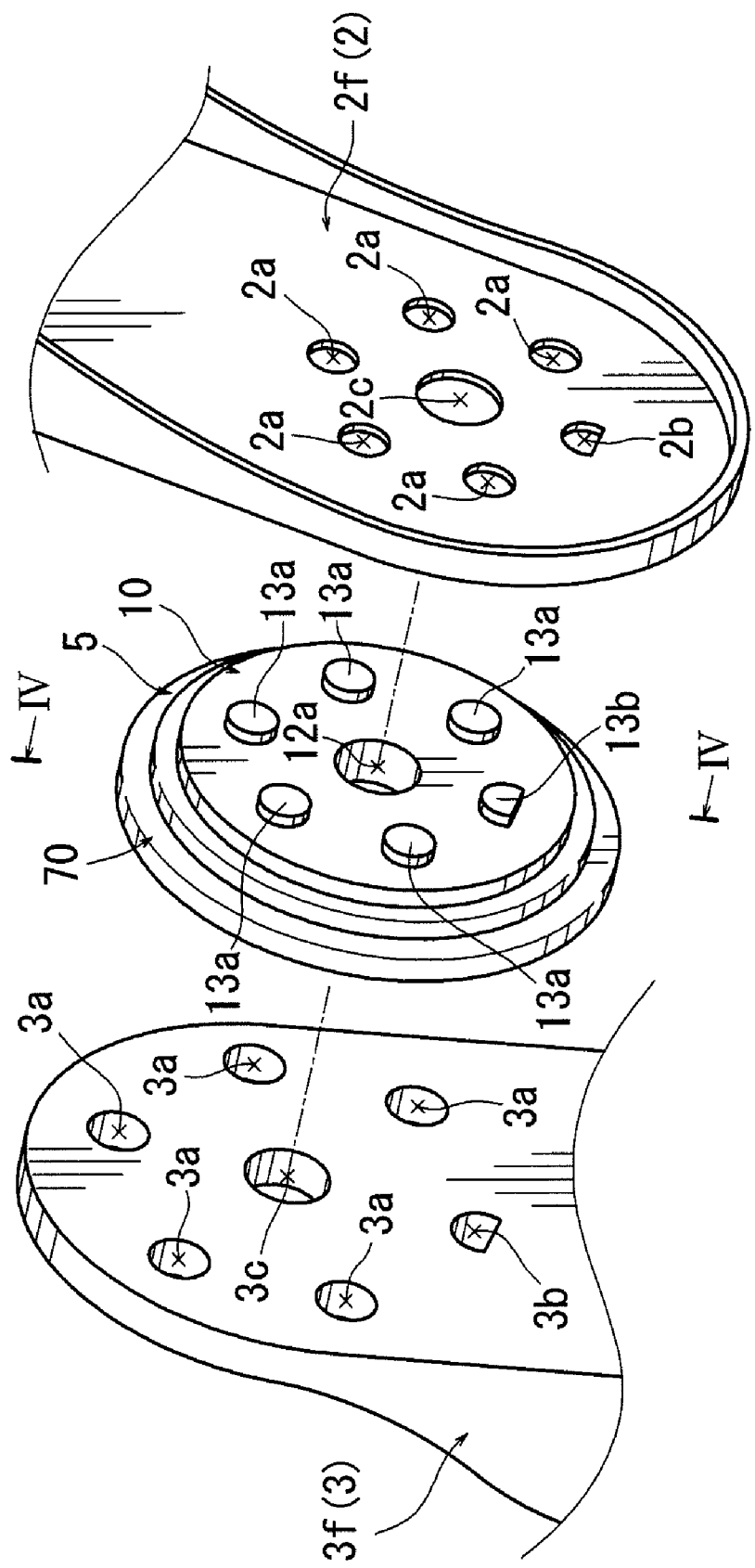
FIG. 3 is an exploded perspective view showing a structure of assembling a reclining apparatus with a vehicular seat.

Here, FIG. 3 shows a structure for attaching the reclining apparatus 4 to the seat back 2 or the seat cushion 3. As shown in the drawing, an outer side circular disk face of the inner tooth member 10 is formed with dowels 13a and a D dowel 13b at positions spaced from the inserting hole 12a in a radial direction and aligned in a circumferential direction.

The dowels 13a and the D dowel 13b are formed to project in the axial direction from the outer side circular disk face by a half blanking process of the inner tooth member 10 in the axial direction. Further, the dowels 13a and the D dowel 13b are configured to be fitted into corresponding dowel holes 2a and a corresponding D dowel hole 2b formed in a back frame 2f constituting a skeleton of the seat back 2.

Further, the back frame 2f is also formed with an inserting hole 2c, into which the shaft pin 60 (refer to FIG. 1) can be inserted, on the same axis line as that of the inserting hole 12a formed in the inner tooth member 10. Here, the D dowel 13b is formed to have a shape of the circular cylinder, a part of which is notched to have a D-like cross section, and the shape is differentiated from that of the dowel 13a having the circular cylinder shape. Therefore, the inner tooth member 10 can be fitted to the back frame 2f so as to be integrally joined thereto, while it is always oriented in a predetermined direction.

The joining between the inner tooth member 10 and the back frame 2f is carried out by arc-welding portions of fitting the dowels 13a and the D dowel 13b in a state where the outer side circular disk face of the inner tooth member 10 and a plate face of the back frame 2f are in a face contact relationship with each other. Here, the state of joining between the inner tooth member 10 and the back frame 2f is shown in detail in FIG. 4.

Next, referring back to FIG. 1, the outer tooth member 20 will be explained.

The outer tooth member 20 is formed in a circular disk shape and is formed to have a central portion other than an outer peripheral edge of the circular disk shape projecting in a circular cylinder shape toward the inner tooth member 10 by a half blanking process in the axial direction. Further, an outer peripheral face of the projected portion in the circular disk shape is formed with outer teeth 21a. Therefore, the portion projected in the circular cylinder shape is formed as an outer gear 21.

Further, a center portion of the outer tooth member 20 is formed with a through hole 22 penetrating in a plate thickness direction. An inner diameter of the through hole 22 is formed to be larger than an outer diameter of the cylinder portion 12 formed on the inner tooth member 10. The through hole 22 is arranged in a state of surrounding an outer peripheral edge of the cylinder portion 12 at inside thereof in a state where the outer tooth member 20 and the inner tooth member 10 are assembled to be overlapped at their circular disk faces. The center of the through hole 22 is coaxial with a center 21r of the outer gear 21 to have a relationship in arrangement therewith such that the through hole 22 and the cylinder portion 12 are offset from each other.

An outer peripheral edge of the outer side circular disk face of the outer tooth member 20 is formed with dowels 23a and a D dowel 23b projecting in the axial direction and aligned in a circumferential direction. The dowels 23a and the D dowel 23b function in the same manner as the dowels 13a and the D dowel 13a explained in the inner tooth member 10. That is, as shown in FIG. 3, the dowels 23a and the D dowel 23b are constituted as fitting portions that are fitted into corresponding dowel holes 3a and a corresponding D dowel hole 3b formed in a cushion frame 3f constituting a skeleton of the seat cushion 3.

Further, the cushion frame 3f is also formed with an inserting hole 3c, into which the shaft pin 60 (refer to FIG. 1) can be inserted on the same axis line as that of the inserting hole 12a formed in the inner tooth member 10. Therefore, the outer tooth member 20 is integrally joined with the cushion frame 3f in a state where it is fitted always in a predetermined direction. The state of joining between the outer tooth member 20 and the cushion frame 3f is shown in detail in FIG. 4.

Figure 5:
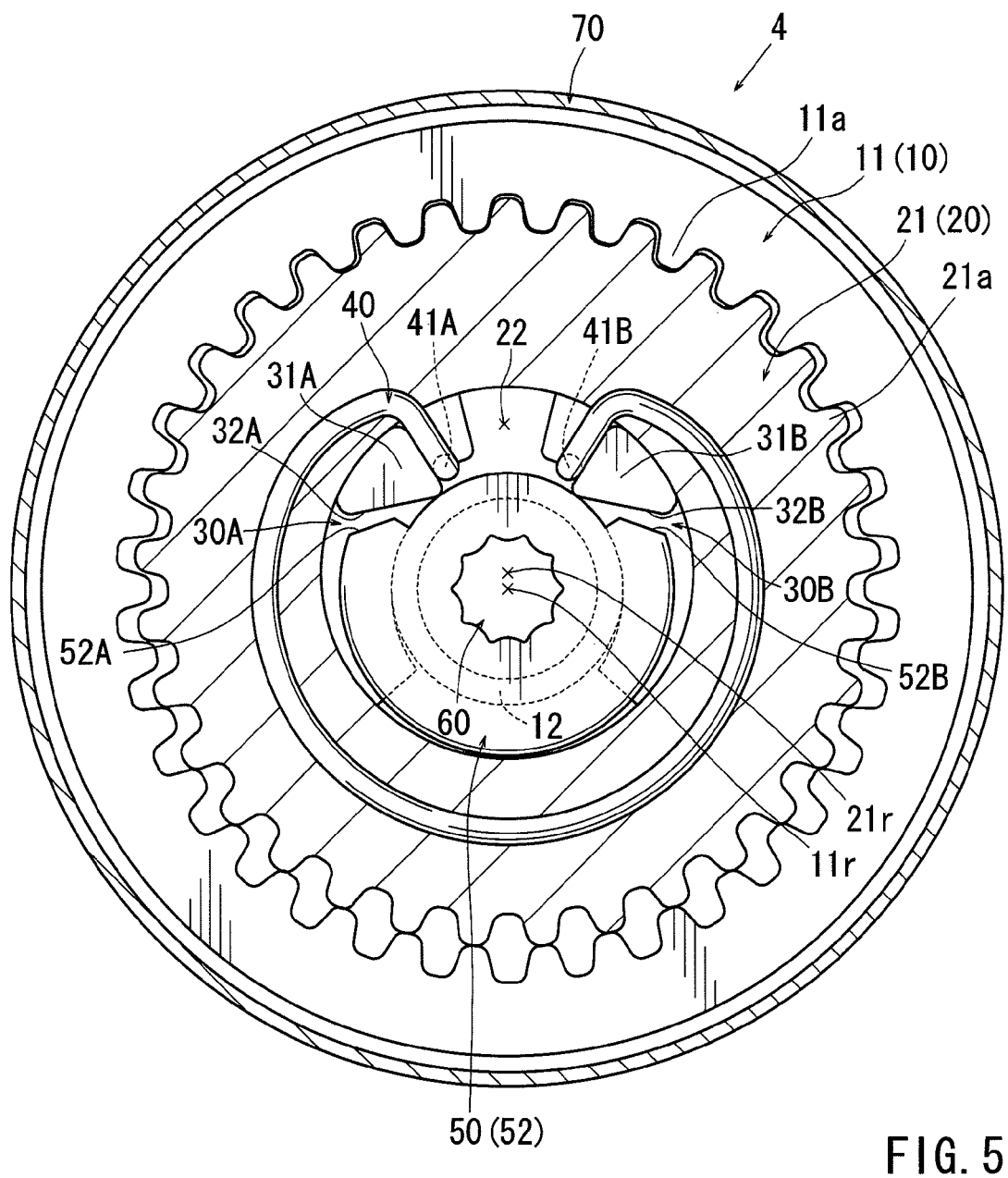
FIG. 5 is a sectional view taken along a line V-V in FIG. 4.

Here, FIG. 5 shows an internal structure of the reclining apparatus 4. As shown in the drawing, the outer gear 21 is formed to have a diameter smaller than that of the inner gear 11 and to have a number of teeth smaller than that of the inner gear 11. Specifically, the number of teeth of the outer tooth 21a of the outer gear 21 is 33 and the number of teeth of the inner tooth 11a of the inner gear 11 is 34.

Therefore, by circulating the outer tooth member 20 to perform a revolving movement along and relative to a tooth face on an inner peripheral side in a state where the outer gear 21 is in meshing with the inner gear 11, a positional relationship relative to the inner tooth member 10 in the rotational direction is shifted at each revolution due to the different in number of teeth mentioned above.

Specifically, the positional relationship in the rotational direction is shifted in the same direction as the direction of rotation of the outer gear 21. That is, in FIG. 5, for example, when the outer gear 21 is moved relative to (relatively revolved) and along the inner peripheral face of the inner gear in the clockwise direction while the outer gear 21 circulates in the counterclockwise direction along the inner peripheral face of the inner gear 11, the outer tooth member 20 is moved to rotate in the counterclockwise direction relative to and along the inner tooth member 10. Further, actually, the outer tooth member 20 is attached to the cushion frame 3*f*, and the inner tooth member 10 is attached to the back frame 2*f*, and therefore, the inner tooth member 10 acts to rotate in the clockwise direction relative to the outer tooth member 20.

Further, tooth shapes of the inner gear 11 and the outer gear 21 will be explained later in detail.

Next, referring back to FIG. 1, the eccentric members 30A, 30B will be explained. That is, the eccentric members 30A, 30B are formed as frame-like members bent along circular arcs and having configurations symmetrical with each other in a left and right direction. The eccentric members 30A, 30B are disposed within a gap formed between the inner peripheral face of the through hole 22 formed in the outer tooth member 20 and the outer peripheral face of the cylinder portion 12 formed in the inner tooth member 10. Therefore, portions of the gap are filled by the arrangement of the eccentric members 30A, 30B. As shown in FIG. 5, the eccentric members 30A, 30B are arranged to be opposed to each other at positions on left and right sides to surround the outer peripheral face of the cylinder portion 12.

Here, as shown in FIG. 1, each of the eccentric members 30A, 30B is formed to have a tapered shape in which the thickness decreases in a radial direction from a portion on an upper side to a portion on a lower side in the paper sheet face of the figure. Further, portions proximal to upper ends of the eccentric members 30A, 30B are formed with projected portions 31A, 31B protruding in the axial direction on the side opposed to the side of facing to the inner tooth member 10 in the drawings. As shown in FIG. 5, faces of the projected portions 31A, 31B on the lower side in the paper sheet face are configured as contact faces 32A, 32B that are adapted to be contacted with and pressed by pushing face portions 52A, 52B of the pushing member 50 mentioned later. The contact faces 32A, 32B are formed to be inclined so as to be oriented radially inwardly with respect to the direction of rotation of the pushing member 50.

Next, referring back to FIG. 1, the spring member 40 will be explained. That is, the spring member 40 is formed to be bent in an open ring shape and to have latching portions 41A, 41B that are formed at opposite ends and latched with upper end portions of the respective eccentric members 30A, 30B.

As is understood by referring to FIG. 5, the spring member 40 urges the upper end portions of the respective eccentric members 30A, 30B in directions of separating the upper end portions from each other. Therefore, the eccentric members 30A, 30B are urged in directions of movement of the lower end portions toward each other under the guide of the gap shape between the outer peripheral face of the cylinder portion 12 and the inner peripheral face of the through hole 22. By urging the eccentric members 30A, 30B in this way, the lower end portions in the tapered shape are maintained in a state of wedging in an inserted manner into the narrowing gaps between the outer peripheral face of the cylinder portion 12 and the inner peripheral face of the through hole 22.

Therefore, the outer tooth member 20 receives pressing forces by the wedging two eccentric members 30A, 30B from the inner peripheral face of the through hole 22 and is maintained in the state where the outer gear 21 is pressed against the inner peripheral face (inner tooth face) of the inner gear 11, so that its revolving movement is stopped.

In detail, the eccentric members 30A, 30B applies wedging forces between the outer peripheral face on an upper side (two shoulder sides) as viewed in the drawings of the cylinder portion 12 and the inner peripheral face of the through hole 22 as they wedge into the gap shapes. Therefore, the outer gear 21 is brought to the state where it is pushed upwardly as viewed in the drawings relative to the cylinder portion 12 (inner gear 11), and the outer tooth 21*a* is maintained at a state where the inner tooth 11*a* is meshed with the inner tooth 11*a* without rattling (backlash).

Next, referring back to FIG. 1, the pushing member 50 will be explained. That is, the pushing member 50 is integrally formed with a fitting portion 51 in a circular cylinder shape, into which the shaft pin 60 can be inserted, and a fin portion 52 extending radially outward in a manner like a fin at one end in an axial direction of the fitting portion 51.

The fitting portion 51 of the former is formed with a serration-like groove face at an inner peripheral face of the cylinder shape and is integrally fitted with the shaft pin 60 in the rotational direction by inserting the shaft pin 60 into the cylinder. Further, the fitting portion 51 is inserted into the inserting hole 12*a* of the cylinder portion 12 formed at the inner tooth member 10 so as to be assembled therewith in a state of being loosely fitted thereto. Therefore, the pushing member 50 is assembled in a state where it is rotatably supported by the cylinder portion 12.

End face portions on the side of two shoulders of the fin shape as viewed in the drawings of the blade portion 52 of the latter are formed as pushing face portions 52A, 52B for pushing and moving the projected portions 31A, 31B of the respective eccentric members 30A, 30B. As shown in FIG. 5, the pushing face portions 52A, 52B are formed to be inclined in such a manner that they are oriented toward radially outer sides relative to the direction of rotation of the pushing member 50 to cause contact in face with the contact faces 32A, 32B of the respective projected portions 31A, 31B.

Further, as shown in FIG. 5, the fin portion 52 is arranged to take a position where it is pinched at a position between the projected portions 31A, 31B formed at the respective eccentric members 30A, 30B. Therefore, when, for example, the shaft pin 60 is operated to rotate in the clockwise direction in the paper sheet face from the illustrated state, also the pushing member 50 is operated to rotate in the clockwise direction integrally therewith.

Figure 6:
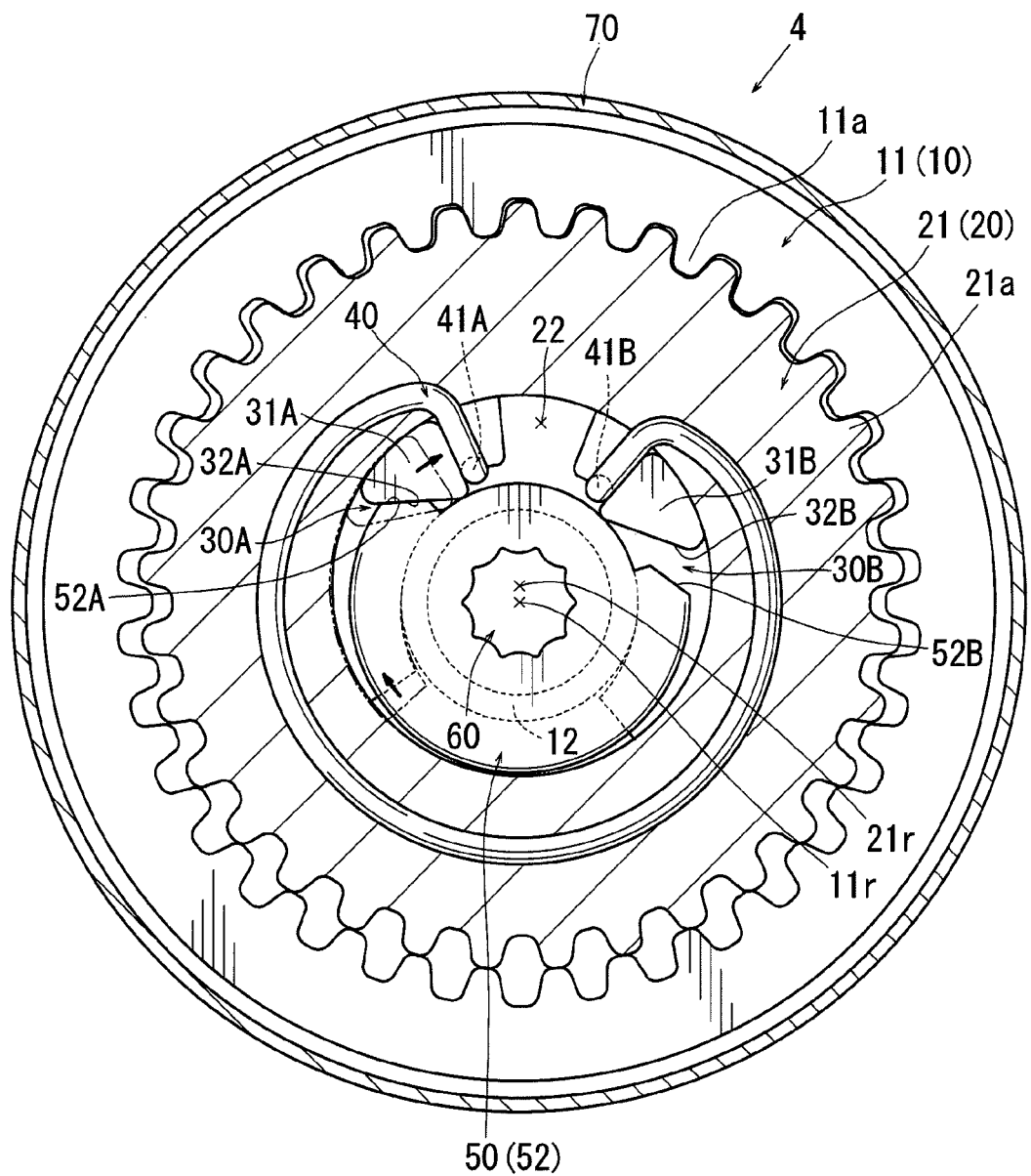
FIG. 6 is a constitutive view showing the state where the wedging state of an eccentric member is released from the state in FIG. 5.

Therefore, as shown in FIG. 6, the pushing face portion 52A on the left shoulder side of the paper sheet face of the blade portion 52 pushes to move the projected portion 31A of the eccentric member 30A arranged on the left side and pushes to move the eccentric member 30A in a direction opposite to the urged wedging direction. In detail, the pushing face portion 52A pushes to move the eccentric member 30A in the clockwise direction as viewed in the drawings while pushing the eccentric member 30A toward the radially outer side by the contact face structures inclined to each other. Therefore, the wedging state of the eccentric member 30A on the left side is released.

Further, because the eccentric member 30A rotates in the clockwise direction as viewed in the drawings, the eccentric member 30B on the right side is operated to rotate in the clockwise direction as viewed in the drawings as it receives the urging force of the spring member 40. Therefore, the inner peripheral face of the through hole 22 formed at the outer gear 21 is pushed by the eccentric clockwise rotation of the two eccentric members 30A, 30B so as to be pressed successively in the clockwise direction as viewed in the drawings while being pushed radially outward. Further, the outer tooth member 20 rotates to revolve in the clockwise direction along the inner peripheral face of the inner gear 11 while the outer tooth member 20 per se is rotates in the counterclockwise direction as viewed in the drawings in the state where the outer gear 21 is meshed with the inner gear 11.

Further, due to the stop of the rotational operation of the shaft pin 60, by the urge force of the spring member 40, the eccentric members 30A, 30B enter the narrowed gaps between the outer peripheral face of the cylinder portion 12 and the inner peripheral face of the through hole 22 so as to be again brought to the wedging state therebetween and are maintained in this state.

Next, referring back to FIG. 1, the outer peripheral ring 70 will be explained. The outer peripheral ring 70 is formed in a shape of a stepped circular cylinder by a half blanking process of a member in a shape of a thin hollow circular disk in a plate thickness direction (axial direction). A face of a portion of the outer peripheral ring 70 on an inner peripheral edge side is formed as an inner tooth side holding face 71 that is adapted to contact with a face of a portion on an outer peripheral edge side of the outer side circular disk face of the inner tooth member 10. Further, as shown in FIG. 4, a face of a portion on an outer peripheral edge side of the outer ring 70 is formed as an outer tooth side holding face 72 that is crimped in such a manner that it contacts with a face of a portion on an outer peripheral edge side of an outer side circular disk face of the outer tooth member 20.

Figure 4:
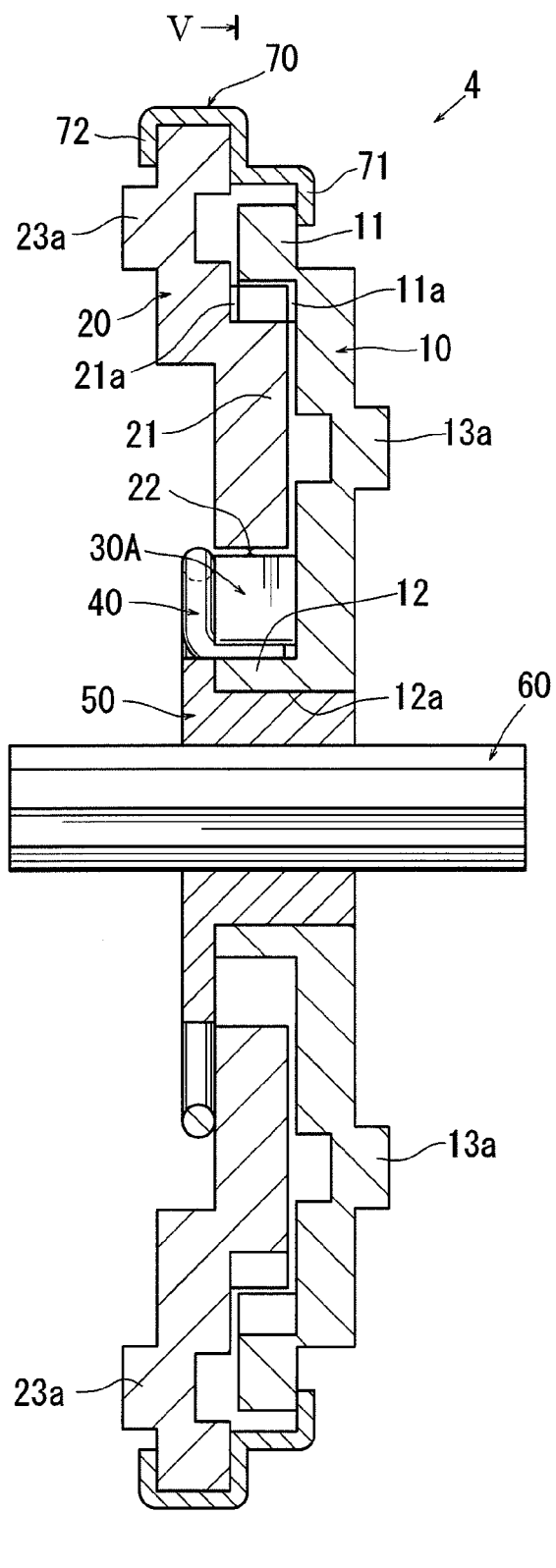
FIG. 4 is a sectional view taken along a line IV-IV in FIG. 3.

As shown in FIG. 4, the outer peripheral ring 70 is configured to be able to maintain always a state where at least a portion of the outer side circular disk face of the inner tooth member 10 contacts by the outer tooth side holding face 72 when the inner tooth member 10 is moved to revolve relative to the outer tooth member 20. Therefore, the inner tooth member 10 and the outer tooth member 20 are maintained in a state where they are pinched by the outer peripheral ring 70 so as not to move for separating in the plate thickness direction Next, tooth shapes of the inner gear 11 and the outer gear 21 of the above-described reclining apparatus 4 will be explained in reference to FIG. 7 through FIG. 10.

Figure 7:
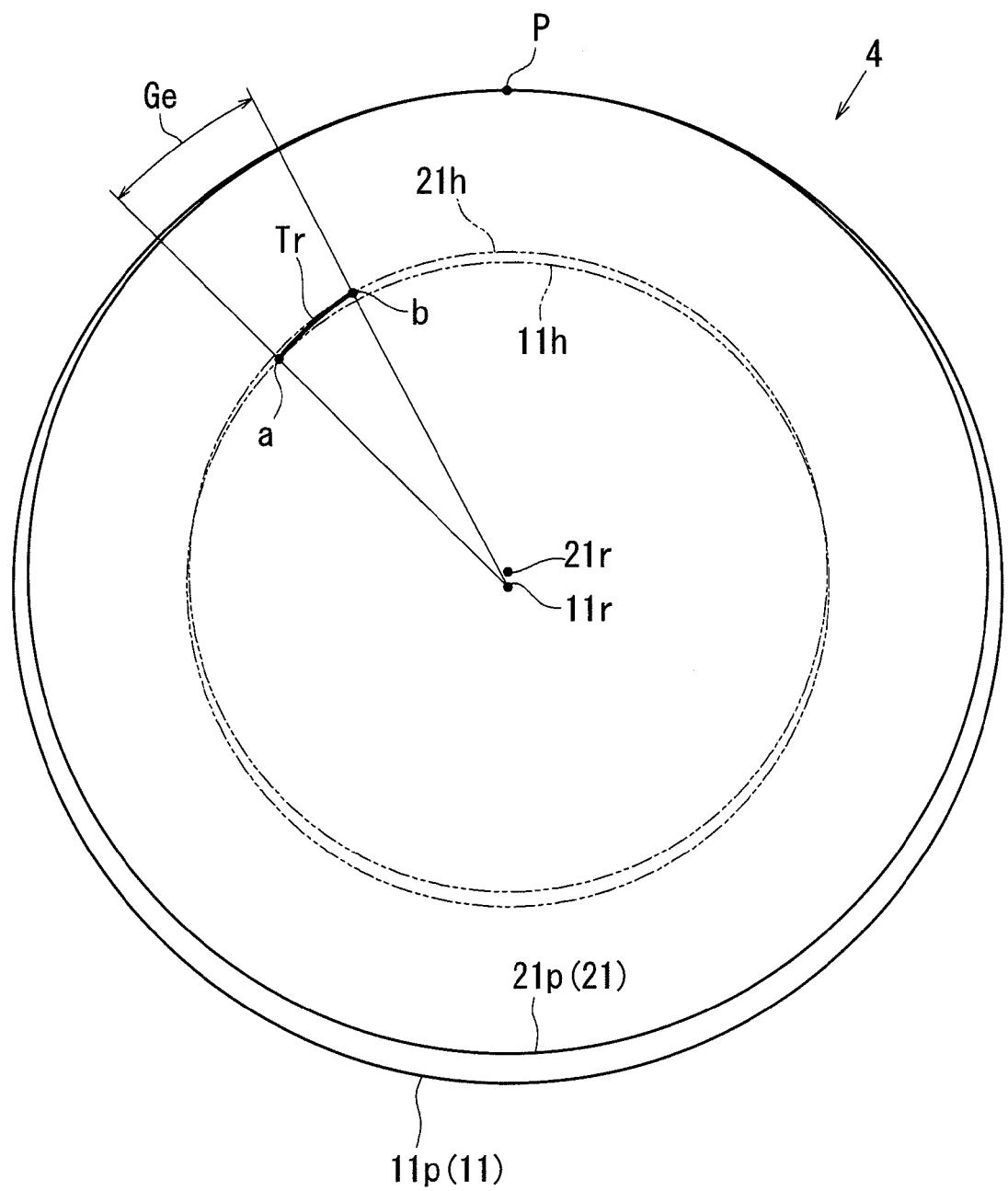
FIG. 7 is a constitutive view showing a pitch circle and a contact point locus line of each gear of a reclining apparatus.

Here, FIG. 7 shows pitch circles 11p, 21p of the inner gear 11 and the outer gear 21 and their contact point locus line Tr. As shown in the drawings, the tooth shapes of the inner gear 11 and the outer gear 21 are determined such that a meshing line between them, that is, the contact point locus line Tr passing a point where the inner teeth 11a and the outer teeth 21a contact with each other is drawn to have a spiral shape. Specifically, the tooth shapes of the inner gear 11 and the outer gear 21 are determined respectively by the following procedure.

First, a method of determining the tooth shape of the inner gear 11 will be explained. Two circles indicated by solid lines in FIG. 7 are pitch circles 11p, 21p of the inner gear 11 and the outer gear 21, respectively. Diameters of the pitch circles 11p, 21p are respectively given by products of tooth numbers of the respective gears (tooth number of inner gear 11: 34, tooth number of outer gear 21: 33) by a module (2.6). Specifically, the diameter of the pitch circle 11p is given as 88.4 mm, and the diameter of the pitch circle 21p is given as 85.8 mm.

Further, the pitch circles 11p, 21p contact with each other at an intersection P in the drawing, and a distance between centers 11r, 21r of them is given as 1.3 mm from the above-described geometrical relationship.

Further, the contact point locus line Tr representing the meshing line of the inner gear 11 and the outer gear 21 is arbitrarily given by an Archimedean spiral. A region (meshing region Ge) where the contact point locus line Tr is drawn is determined as a region between intersections a, b of an effective addendum circle 11h of the inner gear 11 and an effective addendum circle 21h of the outer gear 21 that will be described later.

Figure 8:
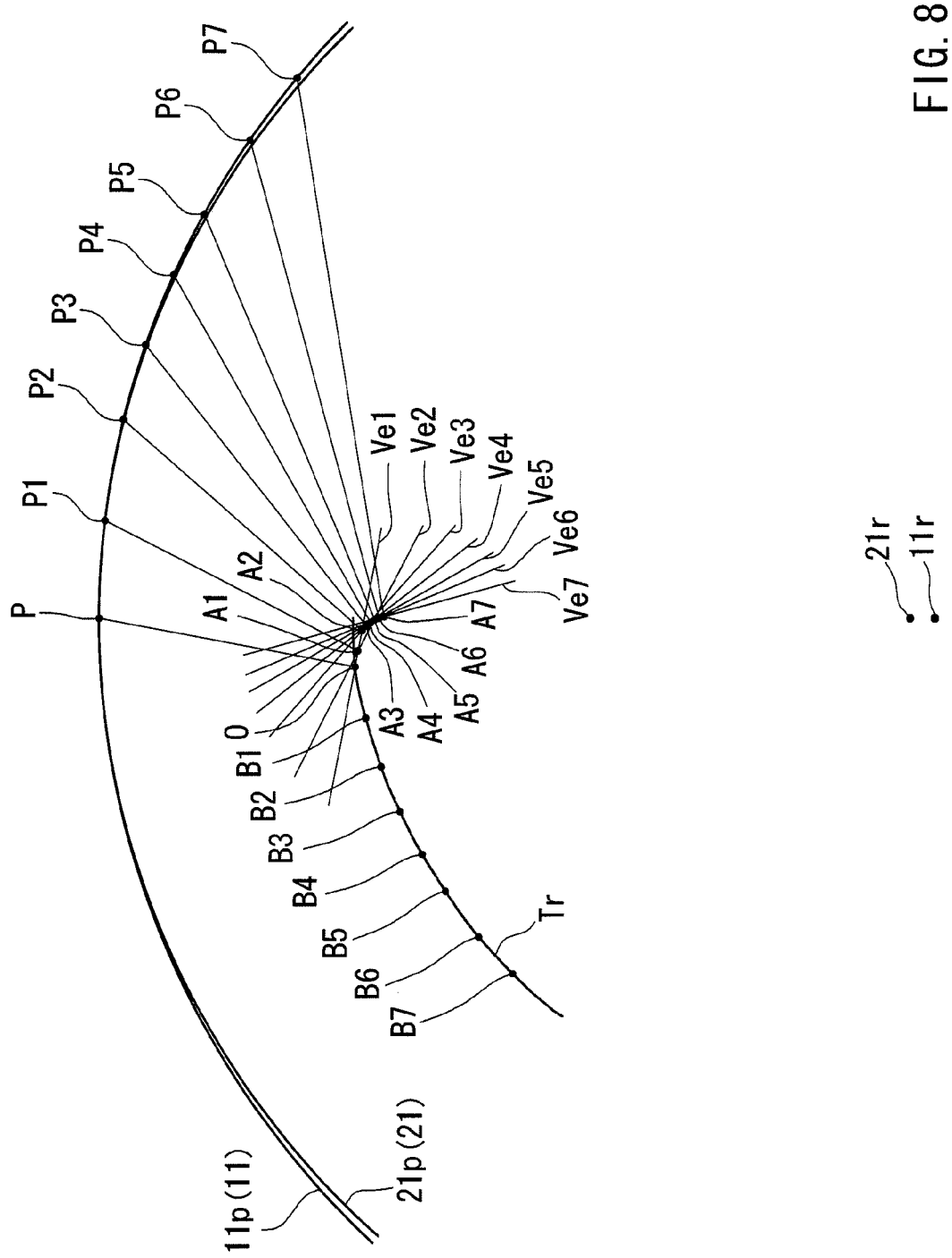
FIG. 8 is a constitutive view showing a procedure of determining a tooth shape of an inner gear of the reclining apparatus.

At first, as shown by FIG. 8, in order to determine the tooth shape of the inner gear 11, a point O is arbitrarily determined at a position on the contact point locus line Tr, and points B1, B2, B3 . . . are further arbitrarily determined at positions successively remote from the point O little by little. Here, in FIG. 8, for better understanding of the explanation, the contact point locus line Tr is indicated to be longer than its actual length.

Next, a normal line Ve1 to a line segment P-O passing through point O is drawn. Further, point B1 and point P are rotated in the clockwise direction in the paper sheet face about center 11r without changing a relative positional relationship between center 11r of the inner gear 11, point B1 and point P. Then, by this rotation, an intersecting point between point B1 and normal line Ve1 is determined as A1, and a position of point P after the movement by the rotation is determined as point P1.

Next, a normal line Ve2 to a line segment P1-A1 passing through point A1 is drawn. Further, point B2 and point P are rotated in the clockwise direction in the paper sheet face about center 11r without changing a relative positional relationship between center 11r of the inner gear 11, point B2 and point P. Further, by this rotation, an intersecting point between point B2 and normal line Ve2 is determined as A2 and a position of point P after the movement by the rotation is determined as point P2.

Similarly, a normal line Ve3 to a line segment P2-A2 passing through point A2 is drawn. Further, point B3 and point P are rotated in the clockwise direction in the paper sheet face about center 11r without changing a relative positional relationship between center 11r of the inner gear 11, point B3 and point P. Further, by this rotation, an intersecting point between point B3 and normal line Ve3 by the rotation is determined as A3, and a position of point P after the movement by the rotation is determined as point P3.

When points O, A1, A2, A3 . . . successively obtained in the same manner are smoothly connected, this gives a portion of the tooth shape of the inner gear 11. Similarly, also the tooth shape of the outer gear 21 can be given by successively moving points determined on the contact point locus line Tr about the center 21r of the outer gear 21.

Figure 10:
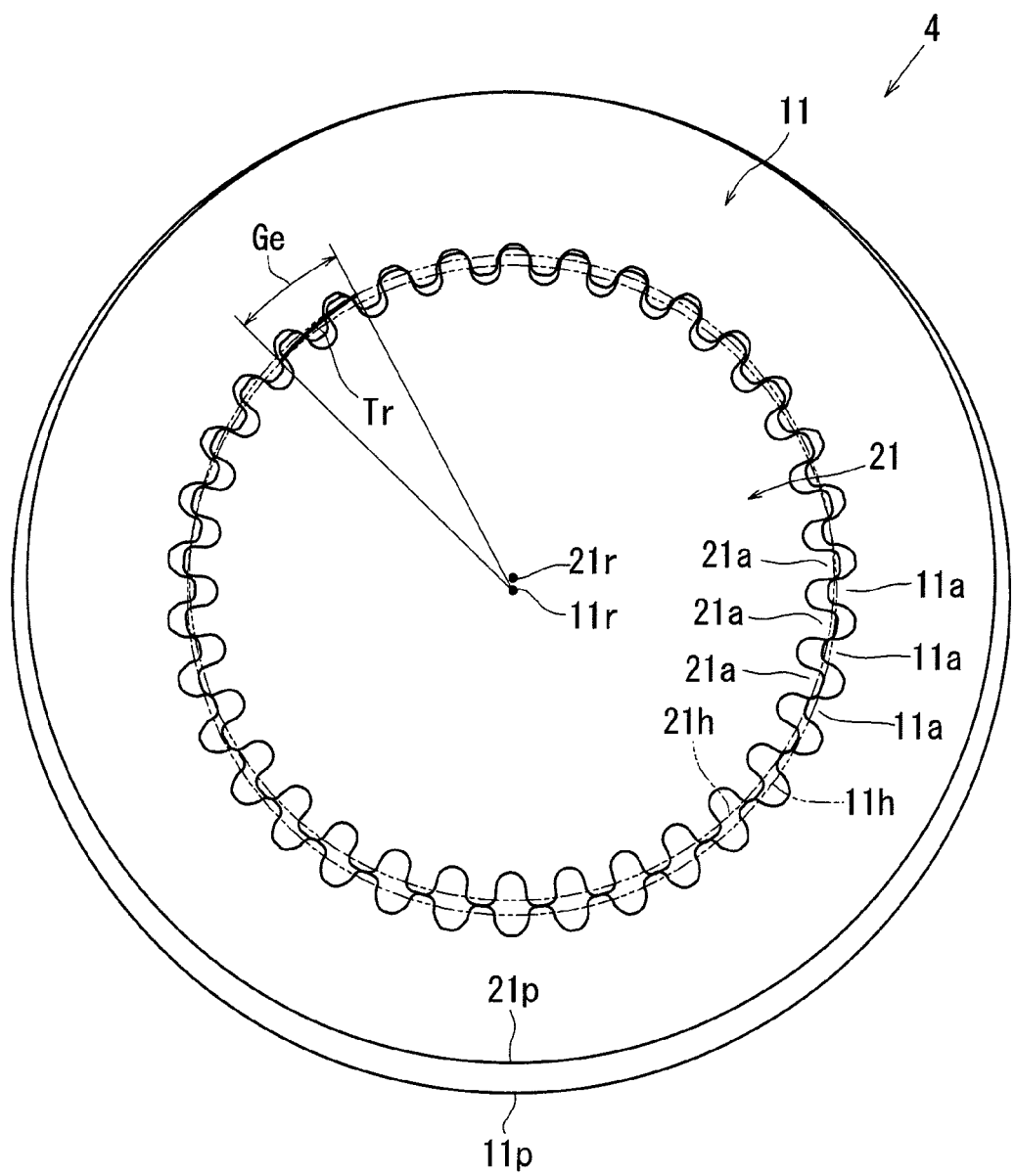
FIG. 10 is a constitutive view showing the entire tooth shapes of an inner gear and an outer gear of the reclining apparatus.

The method of determining the tooth shape from the geometrical relationship between the two pitch circles 11p, 21p and the contact point locus line Tr is a publicly-known method and is described in a document, such as a publication ("Illustrated Mechanism", edited by FUKUNAGA setuo et al, first edition, Rikogaku-sha, Apr. 10, 1972, FIG. 10.2) or the like.

Figure 9:
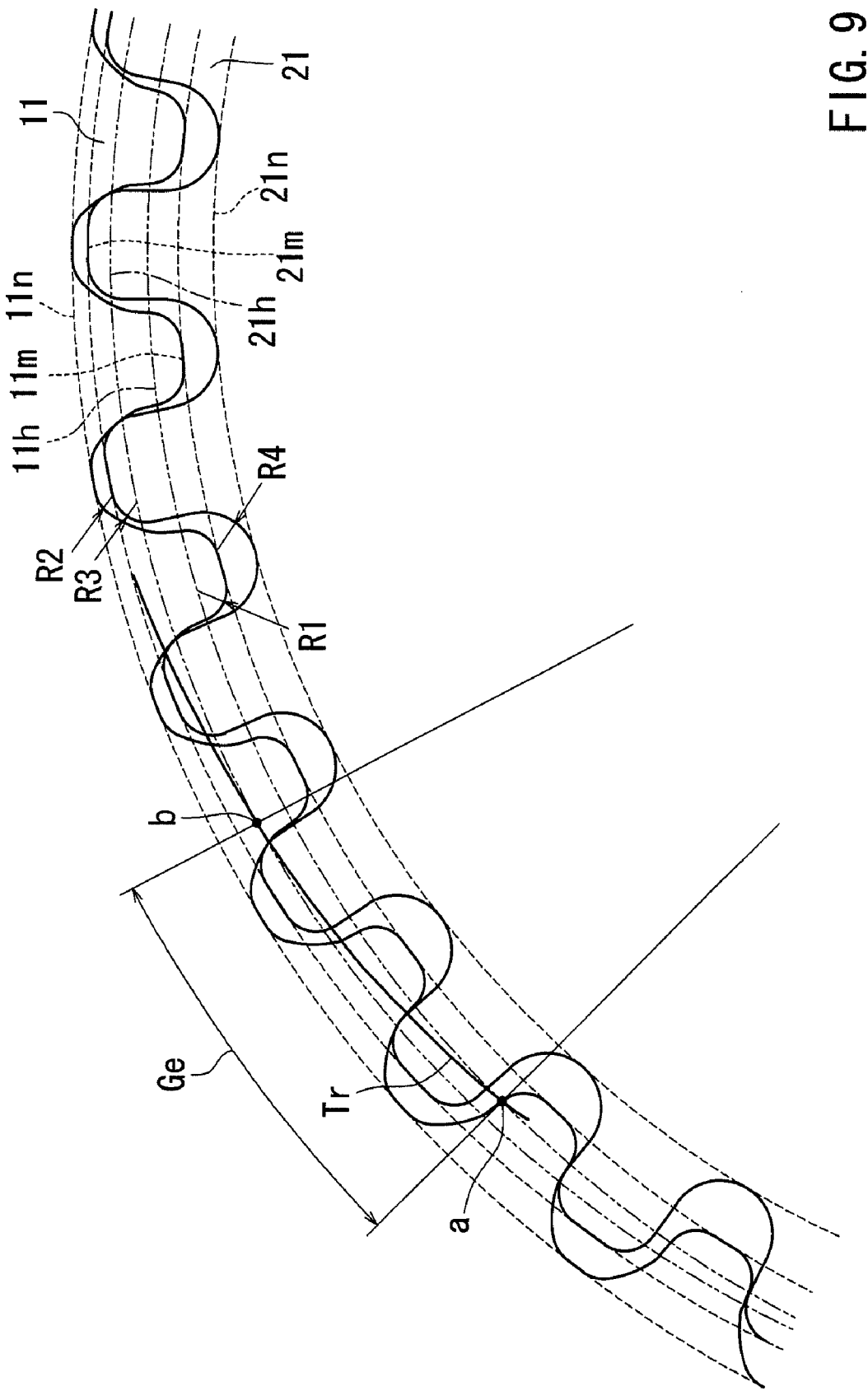
FIG. 9 is a constitutive view showing tooth shapes of an inner gear and an outer gear of the reclining apparatus in an enlarged scale.

Therefore, the tooth shapes of the inner gear 11 and the outer gear 21 are given as shown in FIG. 9 by using the above-described method.

Here, addendums and deddendums of the inner gear 11 and the outer gear 21 are respectively provided with R shape portions (rounded shape portions) R1 through R4 that are necessary when press-molding. Among them, an R shape portion R1 constituting the addendum of the inner gear 11 is formed to extend from an addendum circle 11m to the effective addendum circle 11h set to the inner gear 11. Further, an R shape portion R3 constituting an addendum of the outer gear 21 is formed to extend from an addendum circle 21m to an effective addendum circle 21h set to the outer gear 21. Further, an R shape portion R2 constituting a deddendum of the inner gear 11 is formed to extend from a deddendum circle 11n to an effective deddendum circle, not illustrated, set to the inner gear 11. Further, an R shape portion R4 constituting a deddendum of the outer gear 21 is formed to extend from a deddendum circle 21n to an effective deddendum circle, not illustrated, set to the outer gear 21.

Further, in the reclining apparatus 4 on a large shape side, sizes of its portions are determined such that a diameter of the deddendum circle 11n of the inner gear 11 becomes to be 61.6 mm.

The inner gear 11 and the outer gear 21, the shapes of which are formed as described above, mesh with each other at a tooth face position on the contact point locus line Tr. According to the embodiment, the contact point locus line Tr constituting the Archimedean spiral is adopted, and therefore, a meshing line having a long line length is given in the meshing region Ge between the effective addendum circle 11h and the effective addendum circle 21h. Therefore, a meshing rate of the two gears in the reclining apparatus 4 on the large shape side is set between 2 and 3. Here, the meshing rate is a numerical value given by dividing a line length of the contact point locus line Tr by a normal line pitch. The higher the numerical value of the meshing rate, the higher the meshing strength of the two gears, and the higher the connection strength of the reclining apparatus 4.

Further, FIG. 10 shows entire tooth shapes of the inner gear 11 and the outer gear 21 of the reclining apparatus 4 formed by the above-described method.

Therefore, the operation of adjusting the backrest angle (pivoting operation) of the seat back 2 can be carried out on the left and on the right with an excellent balance in synchronism with each other by cooperative operations of the two reclining apparatus 4, 4.

Here, a method of using the embodiment is omitted because this method is explained by the operating structures the reclining apparatus 4, 4 described above.

In this way, according to the gears and the coupling apparatus using the gears of the embodiment, the tooth shapes are formed such that the meshing line for meshing of the gear trains of the inner gear 11 and the outer gear 21 arranged as the reclining apparatus 4 of the vehicular seat is defined as a spiral mesh line, so that the meshing rate of the gear train can be improved. Therefore, the operation of adjusting the backrest angle of the seat back 2 can excellently be carried out.

Further, by setting the mesh line of the gear train to the Archimedean spiral having a constant circumferential interval, the shapes of the inner gear 11 and the outer gear 21 can highly accurately be finished by a numerical control.

Further, due to the construction of pressing the outer gear 21 against the inner peripheral tooth face of the inner gear 11 by the pair of the eccentric members 30A, 30B in order to maintain a positional condition thereof and to cause revolution of the outer gear 21 by pushing the same in the state without a backlash, the operation for maintaining or adjusting the backrest angle of the seat back 2 can further excellently be carried out.

Although the embodiment of the invention has been explained by using the one embodiment as described above, the invention can be carried out in various modes other than the embodiment.

For example, although in the embodiment, an example of adopting the coupling apparatus of the invention as the reclining apparatus is illustrated, the embodiment can be adopted to other coupling apparatus. That is, the embodiment can also be adopted to other constitution so far as the coupling apparatus is disposed between two frame members and couple them in a state capable of rotating relative to each other. Further, the reclining apparatus is not limited to that of coupling the seat back and the seat cushion, but the reclining apparatus may couple the seat back and the seat cushion in a state capable of rotating relative to a floor.

Further, the tooth number of the outer gear may be larger than that of the inner gear. In this case, the outer tooth member rotates relative to the inner tooth member in a direction opposite to the direction shown in the embodiment in accordance with the relative revolution of the outer gear.

Further, although the meshing line between the two gears is shown to be drawn by the Archimedean spiral, the meshing line may be drawn by a Bernoullis spiral. Further, the spirals are not limited to spirals drawn by bent curves but may be spirals drawn by bending a linear line little by little.

Further, the gears are applicable also to the use other than the coupling apparatus. That is, the gears can be used for other use so far as the gears are those constituting a gear train in which the gears are provided in such a state that they mesh with each other for enabling transmission of a power.

Further, although the spring member is illustrated as the urge member for urging the pair of eccentric members in directions toward each other, other urge member, such as a rubber member or the like, is also applicable.

What is claimed is:

1. A coupling apparatus, comprising:
a reclining apparatus coupling a seat back and a seat cushion of a vehicle seat;
the reclining apparatus includes:
an inner tooth member including an inner gear coupled to one of the seat back and the seat cushion; and
an outer tooth member including an outer gear configured to mesh with the inner gear of the inner tooth member and coupled to the other of the seat back and the seat cushion;
the outer gear is smaller than the inner gear in a diameter thereof and is formed to have a tooth number different from a tooth number of the inner gear; and
a backrest angle of the seat back is varied by a circulating movement of the outer gear on an inner tooth face of the inner gear in a state where the outer gear meshes with the inner gear,
wherein:
the inner gear and the outer gear constitute a gear train and mesh with each other for enabling transmission of a power;
the inner gear and the outer gear have tooth shapes formed such that a meshing line defined by meshing of the inner gear and the outer gear is configured as a spiral meshing line, the spiral meshing line extending circumferentially from a first point on a first curve positioned on a radially inner side of the inner gear and intersecting a second point on a second curve positioned on a radially outer side of the outer gear, the spiral meshing line extending in a direction in which a distance between the first curve and the second curve becomes larger, and the first curve and the second curve defining a meshing region;
the inner gear projects in a circular cylinder shape towards the outer gear, and the outer gear projects in a circular cylinder shape towards the inner gear;
the inner tooth member includes a cylinder portion in a circular cylinder shape projecting from a center portion of the inner gear, the outer tooth member includes a through hole in a circular shape at a center portion of the outer gear for receiving therein and surrounding the cylinder portion of the inner tooth member, and the cylinder portion and the through hole have a positional relationship in which their center portions are offset from each other; and within a gap between the cylinder portion of the inner tooth member and the through hole of the outer tooth member surrounding the cylinder portion, a pair of eccentric members each having a shape that fills a portion of the gap are disposed, the pair of eccentric members being urged to wedge into narrowed portions of the gap and are maintained in a state where the outer gear is pressed against the inner tooth face of the inner gear, at least one of the eccentric members is configured to be pushed in a circumferential direction by a rotational operation of a shaft pin provided in a cylinder of the cylinder portion, and the at least one of the eccentric members is further configured to be released from a wedging state and to press against an inner peripheral face of the through hole of the outer tooth member to cause circulating movement of the outer gear.

2. A coupling apparatus, comprising:

a reclining apparatus coupling a seat back and a seat cushion of a vehicle seat;

the reclining apparatus includes:
 an inner tooth member including an inner gear coupled to one of the seat back and the seat cushion; and
 an outer tooth member including an outer gear assembled in meshing with the inner gear of the inner tooth member and coupled to other of the seat back and the seat cushion;
 the outer gear is smaller than the inner gear in a diameter thereof and is formed to have a tooth number different from a tooth number of the inner gear; and
a backrest angle of the seat back is varied by a relative circulating movement of the outer gear on an inner tooth face of the inner gear in a state where the outer gear meshes with the inner gear, wherein:

the inner gear and the outer gear constitute a gear train and mesh with each other for enabling transmission of a power;

the inner gear and the outer gear have tooth shapes formed such that a meshing line defined by meshing of the inner gear and the outer gear is configured as a spiral meshing line, the spiral meshing line extending circumferentially from a first point on a first curve positioned on a radially inner side of the inner gear and intersecting a second point on a second curve positioned on a radially outer side of the outer gear, the spiral meshing line extending in a direction in which a distance between the first curve and the second curve becomes larger, and the first curve and the second curve defining a meshing region;

the spiral meshing line of the outer gear and the inner gear is an Archimedean spiral;

the inner gear projects in a circular cylinder shape towards the outer gear, and the outer gear projects in a circular cylinder shape towards the inner gear;

the inner tooth member includes a cylinder portion in a circular cylinder shape projecting from a center portion of the inner gear, the outer tooth member includes a through hole in a circular shape at a center portion of the outer gear for receiving therein and surrounding the cylinder portion of the inner tooth member, and the cylinder portion and the through hole have a positional relationship in which their center portions are offset from each other; and within a gap between the cylinder portion of the inner tooth member and the through hole of the outer tooth member surrounding the cylinder portion, a pair of eccentric members each having a shape that fills a portion of the gap are disposed, the pair of eccentric members being urged to wedge into narrowed portions of the gap and are maintained in a state where the outer gear is pressed against the inner tooth face of the inner gear, at least one of the eccentric members is configured to be pushed in a circumferential direction by a rotational operation of a shaft pin provided in a cylinder of the cylinder portion, and the at least one of the eccentric members is further configured to be released from a wedging state and to press against an inner peripheral face of the through hole of the outer tooth member to cause circulating movement of the outer gear.

* * * * *